United States Patent

[11] 3,590,376

| [72] | Inventors | Frederick E. Mindt<br>Raleigh;<br>William J. Zisa, Cary; Walter G. Azelkas, Raleigh; Eugene C. Knecht, Raleigh, all of, N.C. |
|---|---|---|
| [21] | Appl. No. | 718,073 |
| [22] | Filed | Apr. 2, 1968 |
| [45] | Patented | June 29, 1971 |
| [73] | Assignee | Westinghouse Electric Corporation<br>Pittsburgh, Pa. |

[54] METER ASSEMBLY HAVING MULTIPART GASKETED ENCLOSURE WITH COVER HAVING INTEGRAL FASTENING LUGS
2 Claims, 7 Drawing Figs.

[52] U.S. Cl. .................................................. 324/156, 220/40 R
[51] Int. Cl. .................................................. G01r 1/04, B65d 41/06
[50] Field of Search ...................................... 220/40; 324/156, 137

[56] References Cited
UNITED STATES PATENTS

| 2,816,682 | 12/1957 | Brucker | 220/40 X |
| 2,895,637 | 7/1959 | Bakke et al. | 220/40 |
| 3,337,802 | 8/1967 | Gill | 324/156 |
| 1,932,044 | 10/1933 | Mylius | 324/137 X |
| 1,969,499 | 8/1934 | Bradshaw et al. | 324/137 X |
| 2,229,435 | 1/1941 | Barnes | 324/137 X |

FOREIGN PATENTS

| 175,981 | 9/1953 | Austria | 220/405 |

Primary Examiner—Rudolph V. Rolinec
Assistant Examiner—Ernest F. Karlsen
Attorneys—A. T. Stratton and C. L. Freedman ABSTRACT: An enclosure for an electric meter has a cup-shaped glass cover unit. Adjacent its open end the cover unit has spaced lugs or bayonets integral with the remainder of the cover unit. A base unit is molded from a phenolic resin material for the purpose of releasably closing the open end of the cup-shaped cover unit. The base unit has a rim which surrounds the open end of the cover unit and has clamps or flanges which cooperate with the lugs for the purpose of urging the cover unit towards the base unit in response to relative rotation therebetween.

A thin-wall elastomer gasket is provided with a conical configuration. The larger diameter end of the gasket is snugly received within a circular groove provided in the base unit. A conical guide surface formed on the interior surface of the cover unit guides the remaining end of the gasket into proper sealing engagement with the cover unit. Contact blades may pass through the base unit for detachable reception in contact jaws of a conventional meter socket.

PATENTED JUN29 1971

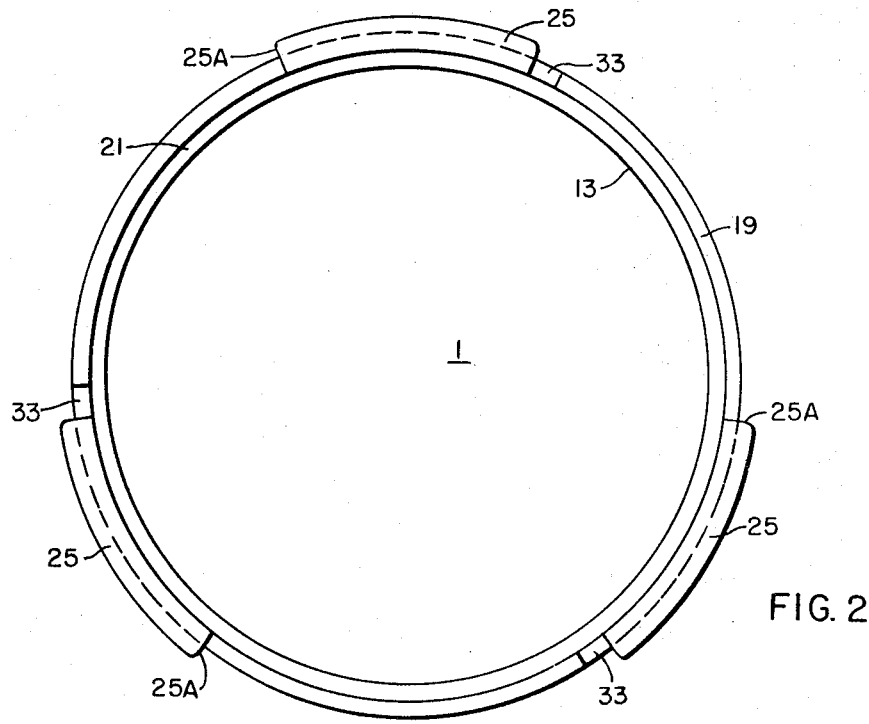
FIG. 2
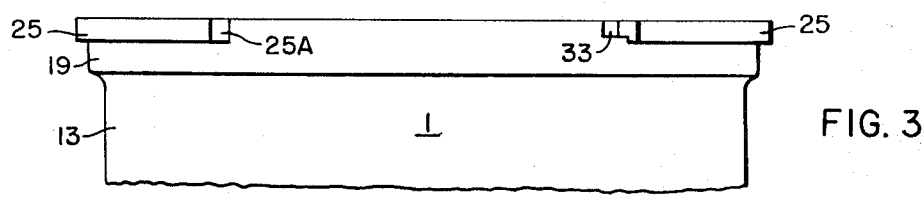
FIG. 3
FIG. 5
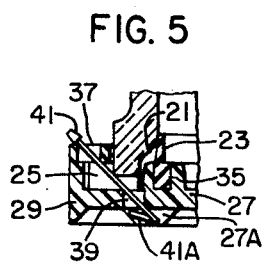
FIG. 6
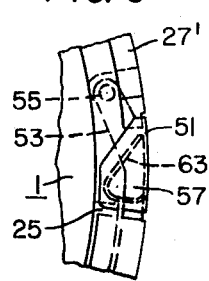
FIG. 7
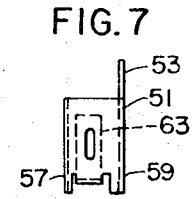
INVENTOR
Frederick E. Mindt, William J. Zisa,
Walter G. Azelkas & Eugene C. Knecht

METER ASSEMBLY HAVING MULTIPART GASKETED ENCLOSURE WITH COVER HAVING INTEGRAL FASTENING LUGS

BACKGROUND OF THE INVENTION

1. Field of the Invention

This invention relates to a multipart gasketed enclosure suitable for receiving an electroresponsive device. It is particularly suitable for an electric induction watt-hour meter and will be described as applied to such a meter arranged for detachable reception in a meter socket.

2. Description of the Prior Art

It has been the practice to locate an electric watt-hour meter within an enclosure formed by a base unit having lugs or bayonets projecting therefrom and a cover unit comprising a glass cup-shaped cover having a metal rim designed for reception of the lugs or bayonets. The handling and stressing incident to the application of the metal rim have resulted in glass breakage. In some cases the stresses applied result in later breakage of the glass.

The metal rim also presents an additional problem of corrosion. Moreover its presence requires care in the type of cleaning to which the cover unit is subjected. Thus the metal rim may prevent the use of caustic cleaning agents and ultrasonic cleaning techniques.

SUMMARY OF THE INVENTION

In accordance with the invention the entire cover unit including lugs or bayonets employed in securing the cover unit to the base unit is a homogeneous structure molded from an insulating material such as glass. The base unit is molded from a suitable material, such as a phenolic resin, and includes a rim portion which surrounds and protects the adjacent end of the cover unit. Moreover the base unit includes clamps or flanges which coact with the lugs to secure the units to each other. A thin-wall conical elastomer gasket is employed which is guided by a conical surface formed on the interior surface of the last cover unit.

It is therefore an object of the invention to provide an improved enclosure for an electroresponsive device.

It is also an object of the invention to provide a meter assembly having a simplified enclosure.

It is another object of the invention to provide a meter assembly having a multipart enclosure which may be readily opened.

BRIEF DESCRIPTION OF THE DRAWINGS

Other objects of the invention will be apparent from the following description taken in conjunction with the accompanying drawing, in which:

FIG. 2 is a view in rear elevation of a glass cover employed in the assembly of FIG. 1;

FIG. 3 is a view in bottom plan with parts broken away of the glass cover unit shown in FIG. 2;

FIG. 5 is a detail view in section showing a sealing device suitable for the assembly of FIG. 1;

FIG. 6 is a detail view in elevation of a modified sealing unit which may be employed; and FIG. 7 is a detail view in side elevation of the sealing unit shown in FIG. 6.

DESCRIPTION OF THE PREFERRED EMBODIMENTS

Figure 1:
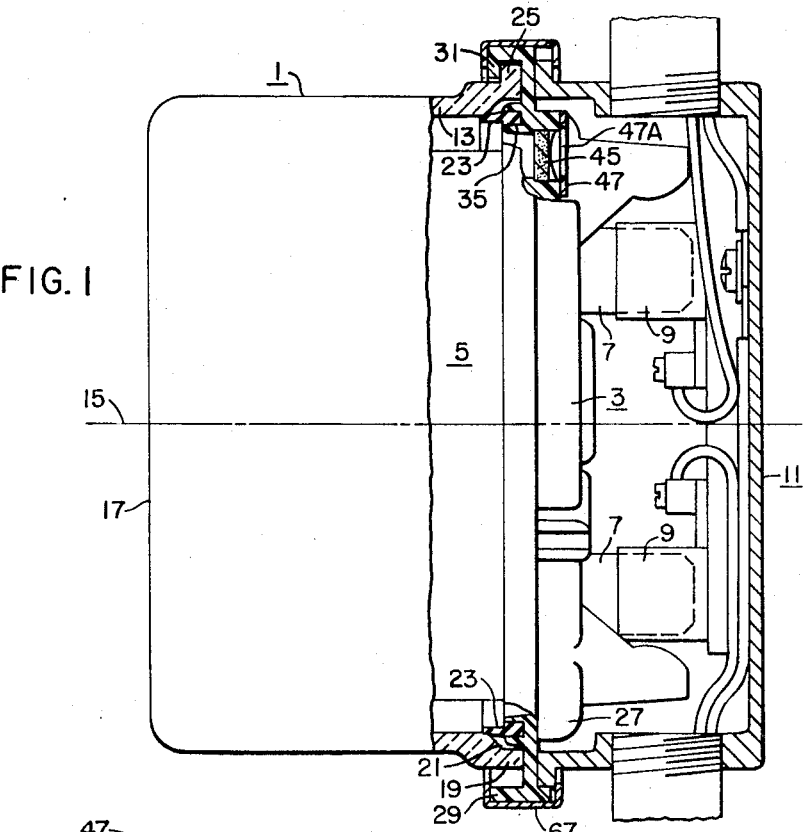
FIG. 1 is a view in side elevation with parts broken away of an electric meter assembly embodying the invention.

Referring to the drawings, FIG. 1 shows a watt-hour meter assembly wherein a cup-shaped cover unit 1 cooperates with a base unit 3 to define an enclosure within which a watt-hour meter 5 is located. Several contact blades 7 project from the base unit for the purpose of establishing electrical connections between components of the watt-hour meter located within the enclosure and an external electric circuit. The contact blades are detachably received by contact jaws 9 located within a conventional cup-shaped socket 11.

The cover unit 1 has a wall portion 13 which is symmetric about a horizontal axis 15. One end of the wall portion is closed by an end portion 17. Although the wall portion 13 may have a cylindrical surface, preferably this surface is tapered to provide a diameter decreasing towards the end portion 17 for the purpose of facilitating molding of the cover unit.

At its open end the cover unit 1 is provided with a ring 19 having a diameter somewhat larger than that of the wall portion 13. The connection between the ring 19 and the wall portion 13 provides a conical guide surface 21 which is useful for guiding the cover unit over a conical gasket 23 and for centering the cover unit as it is applied to the base unit. The guide surface is spaced from the open end of the cover unit and thus is protected from surfaces on which the cover unit is placed.

Several lugs or bayonets 25 project radially outwardly from the ring 19 adjacent the open end units the ring. In the present embodiment three lugs 25 are employed and are spaced uniformly about the periphery of the ring 19. These lugs having a dimension parallel to the axis of the ring 19 which is less than the corresponding dimension of the ring, are part of a bayonet connection between the cover and base units.

The cover unit preferably is molded as a complete integral homogeneous unit from a light-permeable material which permits reading of a conventional meter register through the end portion 17. Preferably the cover unit is constructed of glass.

The base unit 3 includes a base part 27 which substantially closes the open end of the cover unit 1. The base unit also includes a rim 29 which surrounds and overlaps the ring 19. The rim protects the enclosed edge of the cover unit 1 and also guards the space between such edge and the base part 27.

Clamping of the cover unit to the base unit is effected by several flanges or clamps, 31, 31', which project inwardly from the edge of the rim 29. Each clamp 31, 31' overlies a separate one of the lugs 25. Conveniently, the engaging surfaces of the clamp and lug may be so formed or tapered that when the cover unit is rotated in a clockwise direction when viewed towards the right in FIG. 1, the cover unit is forced towards the base part 27. However, such forming or tapering is not essential and may be omitted. Thus the engaging surfaces may be in planes transverse to the axes of the units.

During a mounting operation of a cover unit 1, the cover unit is moved along its axis and each of its lugs 25 moves through the space between a separate pair of the clamps 31, 31'. The previously mentioned clockwise rotation of the cover unit then introduces a first end 25A of each of the lugs beneath an associated one of the clamps 31, 31'. The end 25A of each of the lugs may have a dimension parallel to the axis 15 which is smaller than the corresponding dimension adjacent the second end of the lug to facilitate introduction of the lugs beneath its associated clamp. Adjacent each second end of each of the lugs 25 the ring 19 is provided with a recess 33 which cooperates with the sealing device in a manner which will be discussed below.

A conventional gasket may be compressed between the edge of the cover unit 1 and the base part 27 in a manner well understood in the art for the purpose of assisting in the sealing of the enclosure formed by the cover and base units. Preferably the gasket 23 is a thin-wall conical gasket formed of an elastomer material. The large diameter end of the gasket is snugly received in an annular groove 35 which is formed in the base part 27. When the cover unit 1 is applied to the base unit 3 the conical guide surface 21 engages the smaller diameter end of the conical gasket 23 and tends to center the cover unit relative to the base unit. A seat formed by the intersection of the conical guide surface 21 with the inner surface of the wall portion 13 engages the outer surface of the gasket along a circle which is displaced along the slant height of the gasket from the base part 27. This provides an effective seal while permitting ready mounting and removal of the cover unit relative to the base unit.

The gasket may be formed of a suitable elastomer such as a natural or synthetic rubber. Preferably a synthetic rubber such as a butyl rubber is employed. As representative of suitable values, the gasket may have a wall thickness of the order of one-sixth of an inch and may project from the base part for a slant height of the order of one-fourth of an inch.

When the cover unit is being mounted, a lug 25 follows a first path beneath a first end 31A of each of the clamps 31, 31'. The second end of each of the clamps is connected to the base part 27 by a ramp or inclined guide surface 31B. When the cover unit is being mounted, the ramps 31B permit the lugs 25 to move from engagement with the outer surfaces of the clamps 31 gradually towards the base part as the cover unit is rotated until the lugs are positioned for reception beneath the first ends 31A of the clamps 31. During removal of the cover unit the clamps permit the lugs to ride up into engagement with the outer surfaces of the clamps 31.

In order to seal the cover and base units in mounted position, one of the clamps 31' and the base part 27 are provided with holes respectively 37 and 39 for reception of a headed sealing strip or wire 41. These holes are so positioned that the sealing strip or wire has a portion located immediately behind one of the lugs 25. Consequently the lug cannot be moved away from its mounted position without breaking or removing the sealing wire. The unheaded end of the sealing wire may be bent as shown at 41A to prevent removal of the sealing wire until such end is broken off. The material of the sealing wire is so selected that the movement of the end 41A into alignment with the rest of the wire results in breaking off of such end. Such wires are well known in the art. The base part 27 may be provided with an ear 27A on each side of the exposed end of the sealing wire 41 for protective purposes.

It is the practice to provide a meter base unit with one or more openings through which the meter enclosure may "breathe." Each opening preferably is closed by a filter which may be made of ceramic or fiberglass material. A suitable filter is disclosed in the U.S. Pat. No. 3,337,802 to Gill. In FIG. 5 two openings closed by filters are illustrated in dotted lines 43 and 45. In FIG. 1 the base part 27 is broken away to show the upper filter 45.

Figure 4:
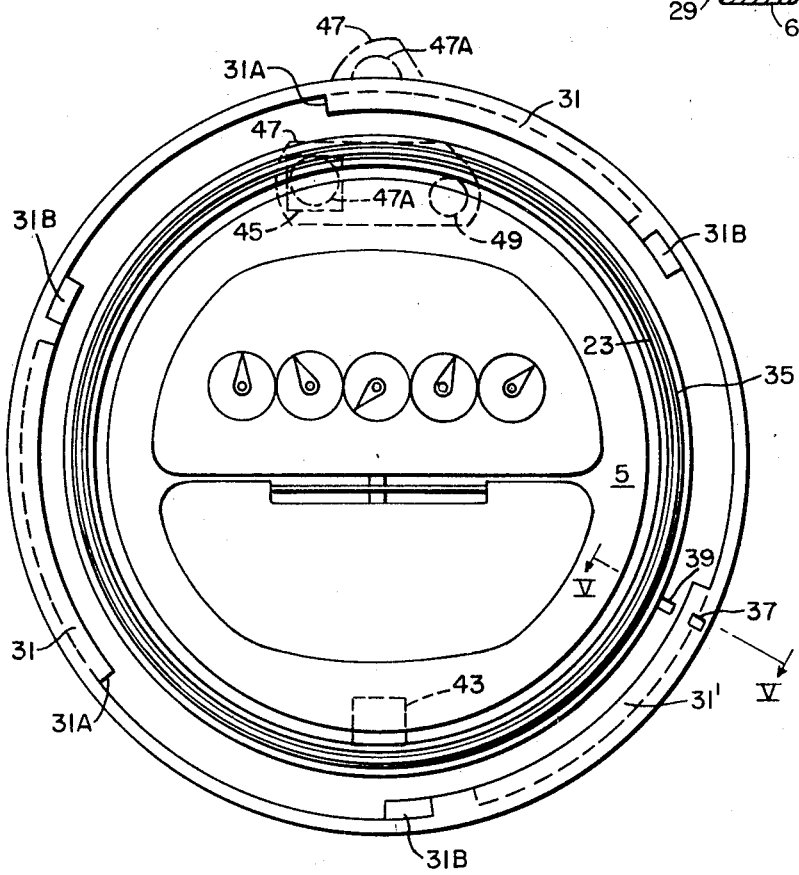
FIG. 4 is a view in front elevation with the glass cover unit removed of the assembly shown in FIG. 1.

A hanger 47 is pivotally mounted on the base part 27 by means of a pin 49. The hanger 47 has a hole 47A by which it may be mounted on a pin when the hanger occupies the position shown in full lines in FIG. 4. When the hanger is retracted to the position shown in dotted lines in FIG. 4, the hole 47A overlies or is aligned with the filter 45 to permit free passage of air through the filter.

The base unit preferably is molded as an integral homogeneous structure from an insulating material such as a phenolic resin.

In the sealing arrangement of FIGS. 6 and 7 a stop unit 51 is pivotally mounted on the base part 27' which corresponds to the base part 27 previously discussed. The stop unit has an arm 53 which is located behind the base part 27' and which is pivotally secured to the base part by means of a pin 55. The stop unit may be formed of a sheet material such as sheet brass and has a U-shaped part comprising two parallel arms 57 and 59 which are connected by a web 61. A tongue 63 is located between the arms 57 and 59 and in FIG. 6 is positioned to abut the lug 25 to prevent removal thereof. The stop unit may be swung in a counterclockwise direction as viewed in FIG. 6 to clear the lug 25 for removal of the cover unit. The web 61 has a slot 65 through which a sealing wire may be passed in the manner discussed with reference to FIG. 5. Until such sealing wire is removed the stop unit 51 cannot be moved from the position shown in FIG. 6.

It should be noted that the cover unit 1 is constructed entirely of a material such as glass. Inasmuch as it includes no metal parts, breakage of cover units is minimized and a substantially lower cost results. The cover unit includes no part subject to corrosion. The more effective cleaning techniques may be employed including ultrasonic techniques and caustic solutions which might affect metallic parts.

The cover and base units both are constructed of insulating materials. Consequently if parts of these units touch the contact jaws or other electrical components during mounting or removal of the units, no short circuiting of such electrical parts can occur.

If desired, a conventional sealing ring 67 may be employed for sealing the enclosure to the socket 11.

We claim:

1. A unitary, homogeneous cover unit for an electroresponsive device comprising a cup-shaped section having a wall portion symmetric about an axis and an end portion closing one end of the wall portion, and a plurality of projecting lugs projecting outwardly from said wall portion adjacent the open end of the cup-shaped section in a direction radial relative to said axis and spaced arcuately about said axis, a base unit substantially closing the open end of the cup-shaped section, said base unit having an end part substantially closing the open end of the cup-shaped section, and a plurality of clamps carried by the end part, each of said clamps being positioned to receive a separate one of the lugs between the clamp and the end part, said clamps and lugs having mating surfaces designed to overlap in locking relationship in response to relative rotation therebetween in one direction, each of said clamps being proportioned for movement through the space between an adjacent pair of said lugs to permit removal of the cover section from the base unit, said base unit including a continuous rim surrounding and overlapping the portion of the cover unit adjacent the open end of said cup-shaped section, each of said clamps having at one end a ramp which forms an inclined path leading from the surface of the clamp remote from the end part towards the end part to permit gradual approach of the cover section toward the end part in response to relative rotation of the cover section and the end part in said one direction, said units defining an enclosure, a watt-hour meter located in said enclosure, a thin-walled conical elastomer gasket interposed between the cover and the base units, said units continuously engaging said gasket along respective circular paths concentric about said axis and spaced from each other along the slant height of said gasket, said base unit having a circular groove concentric about said axis and snugly receiving one end of the gasket, the cup-shaped section of said cover unit having an inner conical surface adjacent the gasket and concentric with said axis, said conical surface having its smaller diameter end in continuous engagement with the outer surface of the gasket and having its larger diameter end nearer to the base unit and flared outwardly from the gasket, whereby the gasket centers the cover unit as it is applied to the base unit, a plurality of electroconductive contact blades projecting exteriorly from said base unit to establish connections between the meter and an external circuit, a socket having a plurality of electroconductive contact jaws for detachably receiving the contact blades, said cover unit being constructed of insulating glass and said base unit being molded from insulating material, said base unit having a breathing passage, a filter located in said passage, and a hanger pivotally secured to said base unit for rotation from a first position overlying said passage to a second position said hanger when in the first position having an opening aligned with said passage to facilitate breathing of the enclosure.

2. A unitary, homogeneous cover unit for an electroresponsive device comprising a cup-shaped section having a wall portion symmetric about an axis and an end portion closing one end of the wall portion, and a plurality of projecting lugs projecting outwardly from said wall portion adjacent the open end of the cup-shaped section in a direction radial relative to said axis and spaced arcuately about said axis, a base unit substantially closing the open end of the cup-shaped section, said base unit having an end part substantially closing the open end of the cup-shaped section, and a plurality of clamps carried by the end part, each of said clamps being positioned to receive a separate one of the lugs between the clamp and the end part, said clamps and lugs having mating surfaces designed to overlap in locking relationship in response to relative rotation therebetween in one direction, each of said clamps being proportioned for movement through the space between an adjacent pair of said lugs to permit removal of the cover section from the base unit, a sealing member, said base unit being designed for receiving the sealing member in interlocking relation relative to the cover unit for preventing substantial relative rotation between the units, said sealing member being a bendable elongated element, said base unit having a passage for receiving the elongated element and holding the element in a position at an angle relative to said axis, said element having an end portion bent to prevent withdrawal of the elongated element from said passage without movement of the end portion relative to the remainder of the elongated element, said elongated element being designed to break in response to said movement.